(12) United States Patent
Chen

(10) Patent No.: US 12,742,965 B2
(45) Date of Patent: Sep. 22, 2026

(54) SHIELD FOR HELMET COMPRISING FIRST AND SECOND WIRELESS MODULES AND AN ANGULAR POSITION SENSOR, HELMET, AND HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 883 days.

(21) Appl. No.: 18/056,889

(22) Filed: Nov. 18, 2022

(65) Prior Publication Data

US 2024/0168286 A1 May 23, 2024

(51) Int. Cl.
*G02B 27/01* (2006.01)
*A42B 3/18* (2006.01)
*B62J 50/22* (2020.01)

(52) U.S. Cl.
CPC ............ *G02B 27/0101* (2013.01); *A42B 3/18* (2013.01); *B62J 50/22* (2020.02); *G02B 2027/0118* (2013.01)

(58) Field of Classification Search
CPC ............ A42B 3/18; A42B 3/042; A42B 3/227
See application file for complete search history.

(56) References Cited

U.S. PATENT DOCUMENTS

| | | | | |
|---|---|---|---|---|
| 10,573,271 | B1 * | 2/2020 | Lvovskiy | A42B 3/042 |
| 2013/0314303 | A1 * | 11/2013 | Osterhout | G06F 3/013 345/8 |
| 2016/0309827 | A1 * | 10/2016 | Dodson | A42B 3/0426 |
| 2017/0075110 | A1 * | 3/2017 | Thomas | G02B 27/017 |
| 2022/0211133 | A1 * | 7/2022 | Lvovskiy | G02B 27/0179 |

* cited by examiner

*Primary Examiner* — Paul C Lee

(74) *Attorney, Agent, or Firm* — MUNCY, GEISSLER, OLDS & LOWE, P.C.

(57) ABSTRACT

A shield for a helmet is provided and the shield is served as a projection screen for a head-up display device. The shield includes an object lens, and an ocular lens. The ocular lens is positioned above the object lens. The object lens reflects an image displayed on the head-up display device at a front-bottom of the helmet, the image being reflected by the object lens and then projected to the ocular lens, after that, the image is reflected by the ocular lens to rear of the ocular lens. The aforementioned arrangement reduces electronic components attached to the helmet and further provides an embodiment in regard to the head-up display device and a head-up display system for the helmet.

7 Claims, 8 Drawing Sheets

SHIELD FOR HELMET COMPRISING FIRST AND SECOND WIRELESS MODULES AND AN ANGULAR POSITION SENSOR, HELMET, AND HEAD-UP DISPLAY DEVICE

BACKGROUND

Technical Field

The present disclosure is directed to a head-up display device for a rider. The head-up display device reduces electronic components attached to a helmet.

Related Art

TWM563171 discloses a helmet with a head-up display comprising a helmet, an optical engine module, and a reflective mirror. The helmet includes a body and a lens, and the lens is engaged to the body with a fastening component. The optical engine module is configured on a cap of the body and adjacent to the fastening component, and projects an image. The reflective mirror is configured under the optical engine module and is positioned on an optical path where the optical engine module projects the image, enabling the reflective mirror to receive the image and then reflect the image to eyes of a rider. The image is regarding a traffic condition in front of the rider, which is convenient for the rider to observe a real time traffic condition.

Numerous references also disclose display modules of head-up displays being configured in motorcycle helmets for displaying images on shields of the helmets for riders to observe. However, to arrange a foldable optical path inside the helmet, e.g., installing optical modules (e.g., display modules) or installing several camera modules makes the helmet itself heavy, causing the center of gravity to shift, affecting a protective effect of the helmet.

SUMMARY

The present disclosure is directed to a shield for a helmet being served as a projection screen for a head-up display device on a mobile vehicle.

The shield includes an object lens and an ocular lens. The ocular lens is positioned above the object lens. The object lens reflects an image displayed on the head-up display device on the mobile vehicle. The image is reflected by the object lens and then projected to the ocular lens, after that, the image is reflected by the ocular lens to rear of the ocular lens. The aforementioned arrangement reduces electronic components attached to the helmet.

In some embodiment, the image is reflected by a front surface of the object lens and then projected to a rear surface of the ocular lens.

In some embodiment, the object lens is a convex spherical surface or a hyperbolic spherical surface.

In some embodiment, the object lens is provided with a reflective film. A reflectivity of the reflective film ranges between 50%~80%.

In some embodiment, the ocular lens is a concave spherical surface or a transparent hyperbolic spherical surface. An angle between the ocular lens and a vertical line is greater than an angle between the object lens and the vertical line.

In some embodiment, the object lens and the ocular lens are two separated shield bodies.

In some embodiment, the shield has an opening positioned between the object lens and the ocular lens, or the shield has a connection shield body positioned between the object lens and the ocular lens.

In some embodiment, the shield further includes a first axel set for adjusting positions of the object lens.

In some embodiment, the shield further includes a second axel set for adjusting positions of the ocular lens.

The present disclosure further provides a helmet comprising the aforementioned shield. The helmet has a helmet body provided with an opening in front of the helmet body. The shield is positioned on the opening.

In some embodiment, the helmet further includes an angular position sensor.

In some embodiment, the helmet further includes a first wireless module.

The present disclosure further provides a head-up display device configured in a mobile vehicle. The head-up display device comprises a second wireless module and a display module. The second wireless module receives an angle value being related to the shield. The display module selects a high brightness mode or a low brightness mode based on the angle value and projects an image to the shield. When the angle value maintains within an angle range during riding, the display module projects the image in the high brightness mode. When the angle value isn't within an angle range during riding, the display module projects the image in the low brightness mode.

In some embodiment, the shield includes an object lens and an ocular lens. The object lens reflects the image, the image being reflected by the object lens and then projected to the ocular lens.

In some embodiment, the image is reflected by a front surface of the object lens and then projected to a rear surface of the ocular lens.

In some embodiment, the display module projects the image to the shield of the helmet.

In some embodiment, the helmet has an angular position sensor for determining the angle value.

In some embodiment, the head-up display device further comprises an acceleration sensor for detecting changes of the angle value due to inertia.

In some embodiment, the second wireless module and the helmet are provided with a pairing information. The display module projects the image to the shield based on the pairing information.

In some embodiment, the display module is provided with more than two kinds of brightness modes.

DETAILED DESCRIPTION

Directions stated below is based on a rider riding a mobile vehicle, and a forward direction of the mobile device is referred as front to conform with common understandings of a person having ordinary skills in the art. The aforementioned mobile vehicle is directed to a two-wheeler or a three-wheeler that uses handlebars to steer front wheels, e.g., a motorcycle, a scooter, but it may also be other lightweight mobile vehicles, e.g., a bicycle or an electric bicycle.

Figure 1:
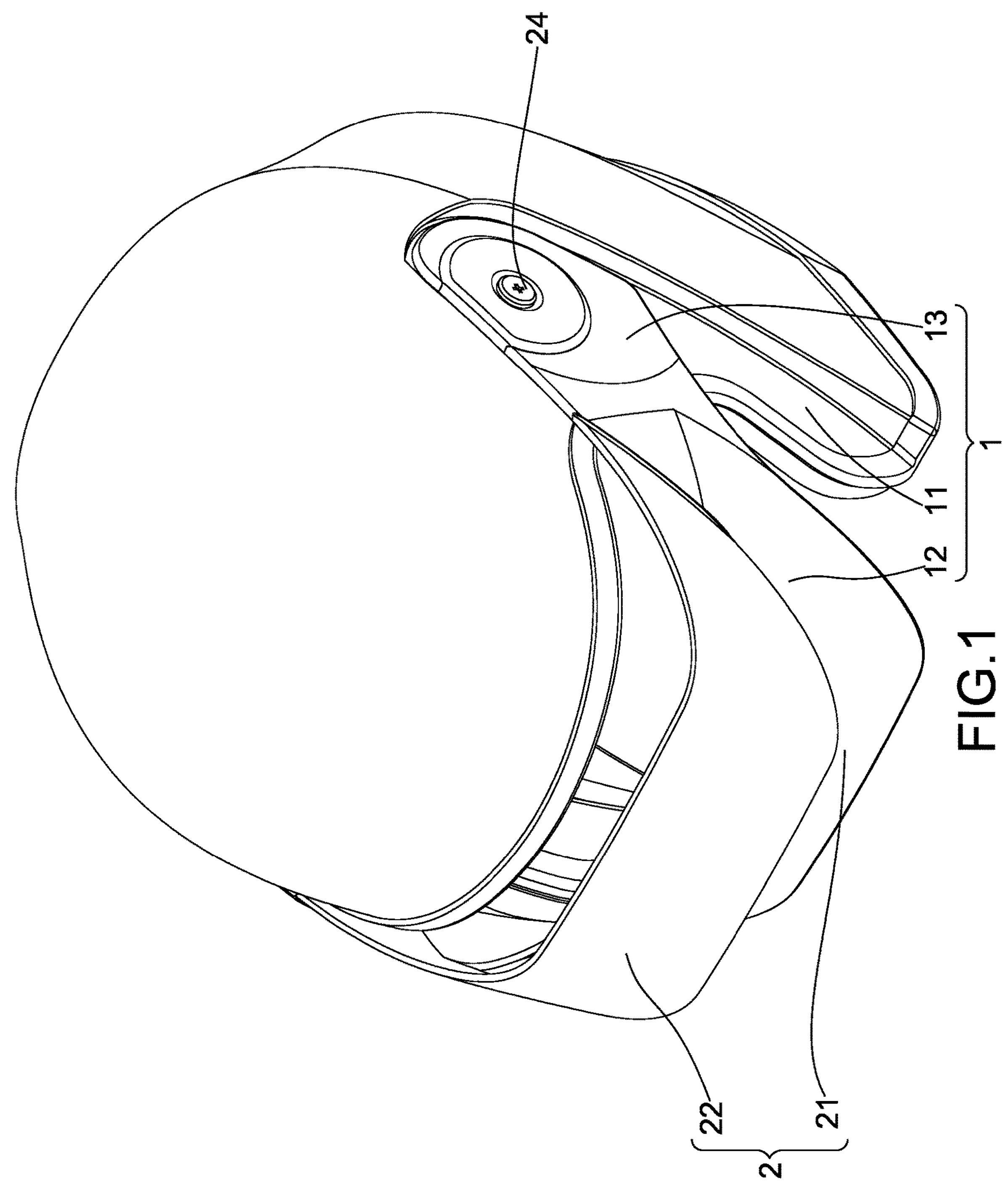
FIG. 1 is a schematic diagram of a helmet according to some embodiment of the present disclosure.
Figure 2:
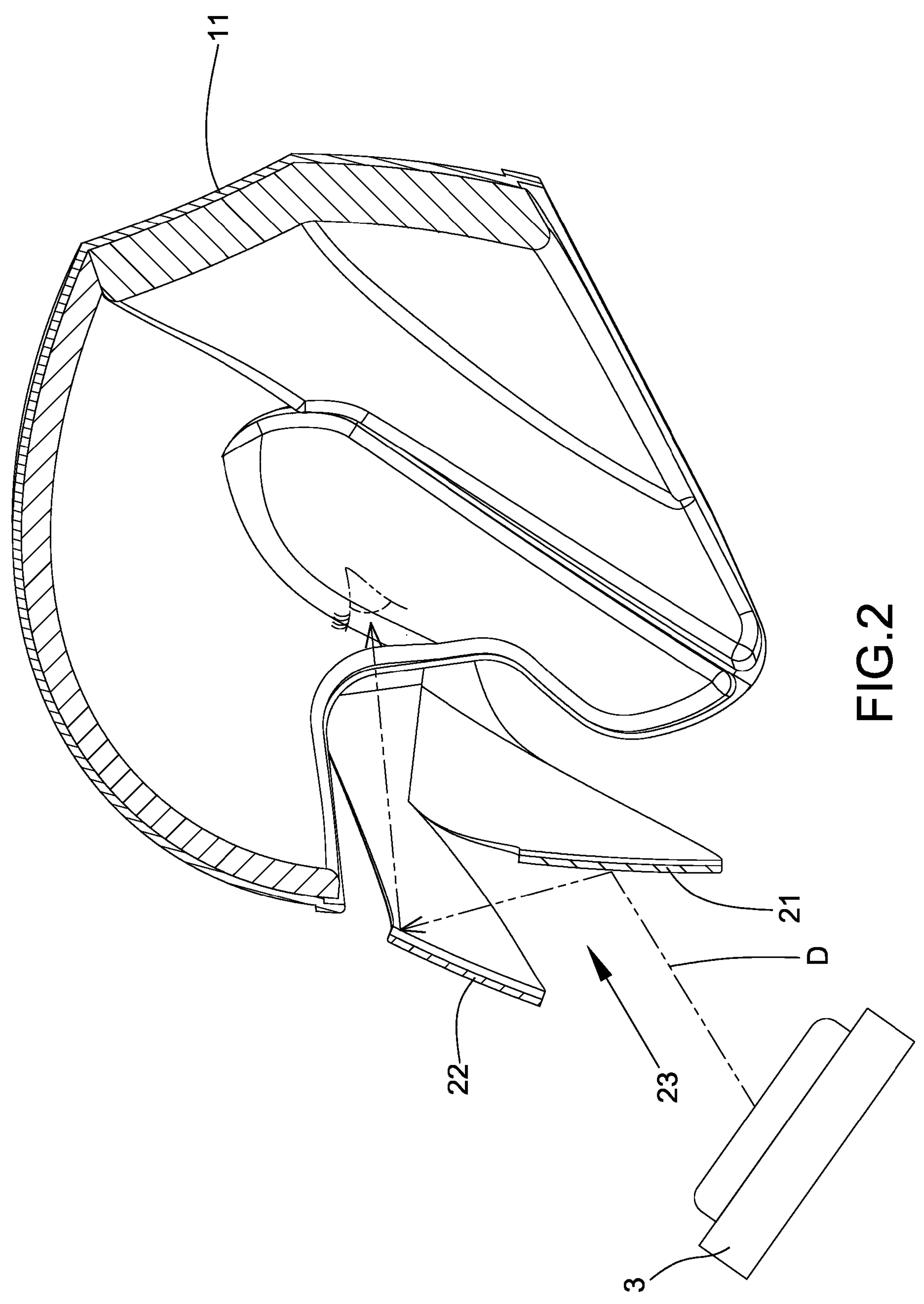
FIG. 2 is a schematic diagram of an optical path between the helmet and a head-up display module.

Please refer to FIG. 1 and FIG. 2, the present disclosure provides an embodiment of a helmet comprising a helmet body 1 and a shield 2.

The helmet body 1 has a base 11 provided with an opening 12 in front of the base 11.

The shield 2 includes an object lens 21, an ocular lens 22 and two side portions 13. The object lens 21 and the ocular lens 22 are shield bodies extending from the two side portions 13 of the shield 2 to the middle of the shield 2. The two side portions 13 of the shield 2 are connected to the base 11, enabling the shield 2 to be positioned on the opening 12. The shield 2 further includes a lower portion and an upper portion. The object lens 21 is positioned at the lower portion of the shield 2. The ocular lens 22 is positioned at the upper portion of the shield 2.

The object lens 21 is configured to reflect an image D displayed on a head-up display device 3 at a front-bottom of the helmet, the image D being reflected by the object lens 21 and then projected to the ocular lens 22, after that, the image D is projected to eyes of the rider. Specifically, the object lens 21 is provided with a front surface and the ocular lens 22 is provided with a rear surface, the image D being projected to the front surface of the object lens 21 and then the image D being reflected and projected to the rear surface of the ocular lens 22, after that, the image D being projected to the eyes of the rider.

Consequently, there is no need to arrange a reflective optical path inside the helmet. It is hardly necessary to arrange any electronic components (especially display modules) in the helmet. The rider is capable of observing the image displayed on the head-up display device without affecting a protective effect of the helmet itself. If the shield 2 is damaged, it can be continued to be used by simply replacing the shield 2.

In some embodiment, the head-up display device 3 may be configured on the mobile vehicle or a position on a steering handle, so that a distance (object distance) between the rider and the head-up display device 3 is greater than related arts combined with head-up display devices on the helmet to perform a greater image distance.

The present disclosure provides an embodiment, the object lens 21 is a convex spherical surface or a hyperbolic spherical surface. The object lens 21 is coated with a film on its surface or attached with a reflective film to raise a reflectivity of the image. The reflectivity of the surface of the object lens 21 ranges between 50%~80%, so that the object lens 21 doesn't block a view underneath the rider entirely.

The ocular lens 22 is a concave spherical surface or a transparent hyperbolic spherical surface. An angle between the ocular lens and a vertical line is greater than an angle between the object lens and the vertical line, enabling the rider to observe a real scene in the front and the image simultaneously. The ocular lens 22 magnifies the image D several times and the image D is displayed in a distance several times farther than the object distance, enabling the eyes of the rider to observe the image D formed in 4~6 meters (image distance) and the image D to be further magnified.

The present disclosure provides an embodiment, the shield 2 is an open shield. The object lens 21 and the ocular lens 22 are two separated shield bodies extending from the two side portions 13 of the shield 2 to the middle of the shield 2. The shield 2 has an opening 23 positioned between the object lens 21 and the ocular lens 22, enabling the wind to come through the opening 23 and preventing the rider from feeling sultry.

Figure 8:
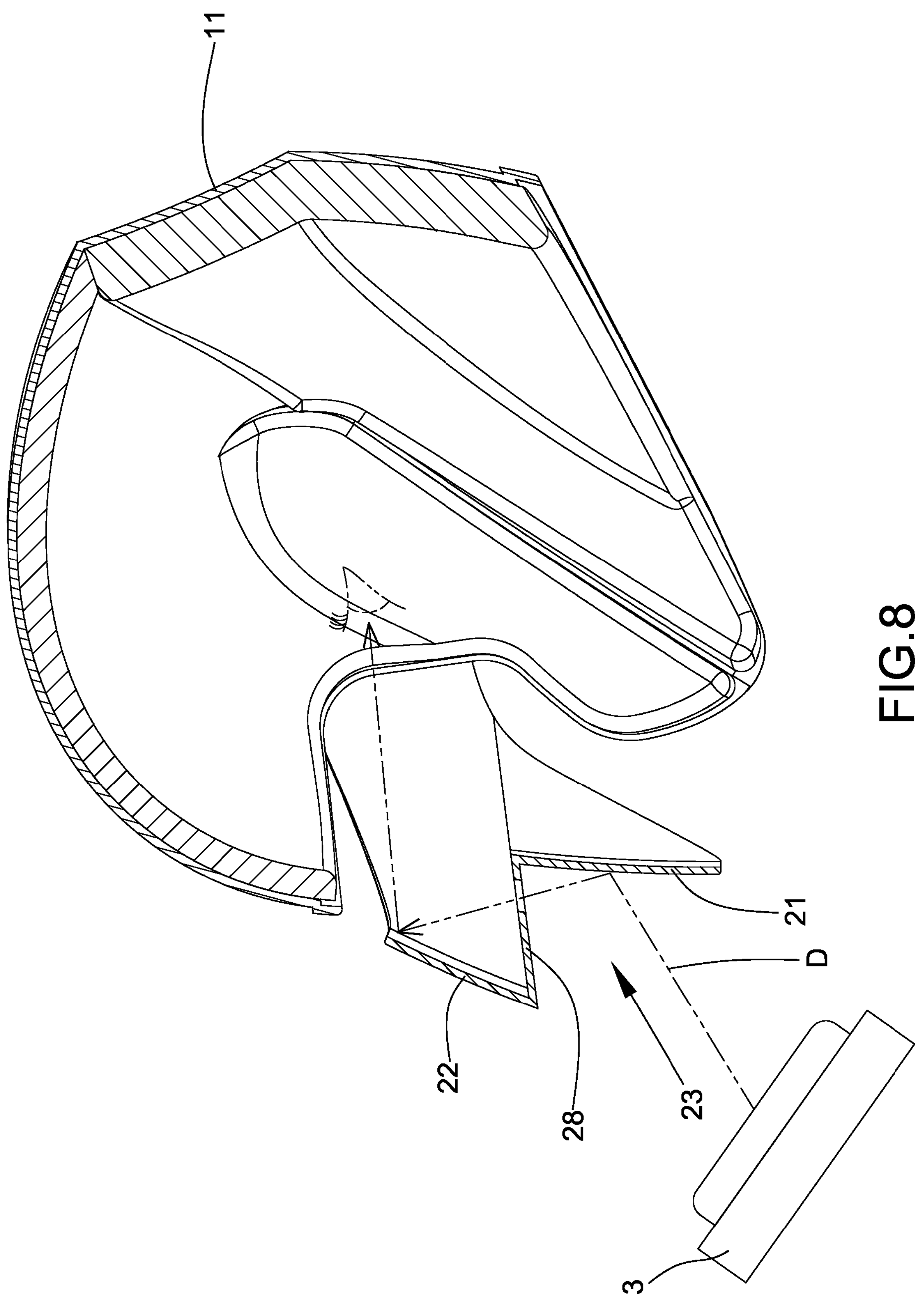
FIG. 8 is a schematic diagram of the helmet according to some embodiment of the present disclosure.

In some embodiment, as shown in FIG. 8, the shield 2 is a closed shield, that is, the shield 2 has a connection shield body 28 positioned between the object lens 21 and the ocular lens 22 for preventing the wind and rain from coming into the helmet to cause discomfort to the rider.

Figure 3:
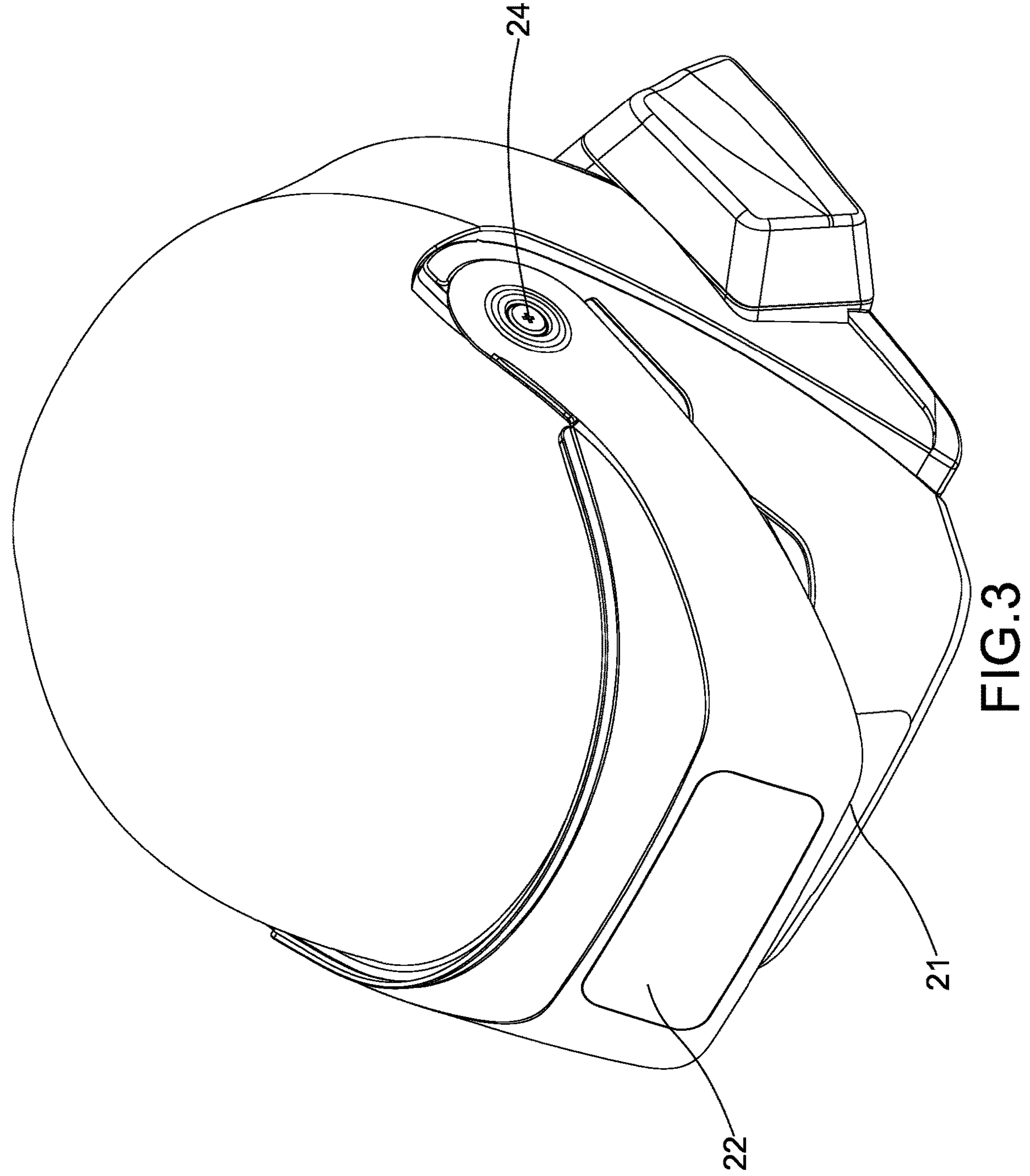
FIG. 3 is a schematic diagram of the helmet according to some embodiment of the present disclosure.

In some embodiment, the shield 2 has two side portions 13 provided with a first axel set 24. The first axel set 24 is connected to two sides of the base 11 for adjusting angles of the object lens 21, or adjusting angles of the object lens 21 and the ocular lens 22 simultaneously, as shown in FIG. 3, the object lens 21 and the ocular lens 22 are separated shield bodies that are capable of adjusting angles of the object lens 21 and the ocular lens 22 individually.

Figure 4:
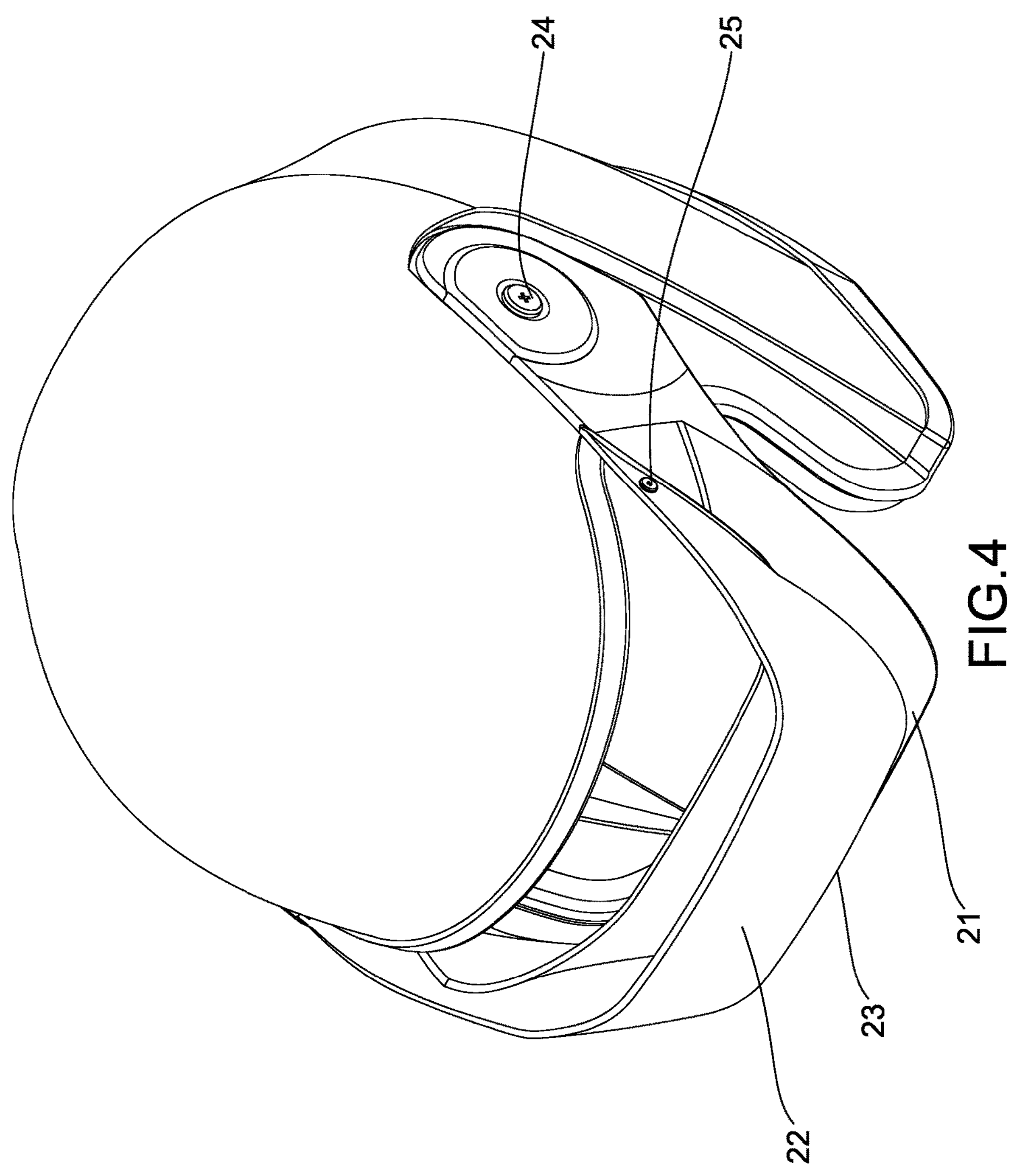
FIG. 4 is a schematic diagram of the helmet according to some embodiment of the present disclosure.

The helmet shown in FIG. 4 and the embodiment shown in FIG. 1 differ in the shield 2 further comprising a second axel set 25. The second axel set 25 is pivotably attached to the object lens 21 and the ocular lens 22, enabling the object lens 21 to pivot on the ocular lens 22 for adjusting the reflective angle of the image D.

It is worth mentioning, the aforementioned shield 2 may also be worn by a user, e.g., the shield 2 is made in form of an eye mask. The shield 2 is provided with the side portions 13 forming a support, so the shield 2 can be worn on the head of the user.

Figure 5:
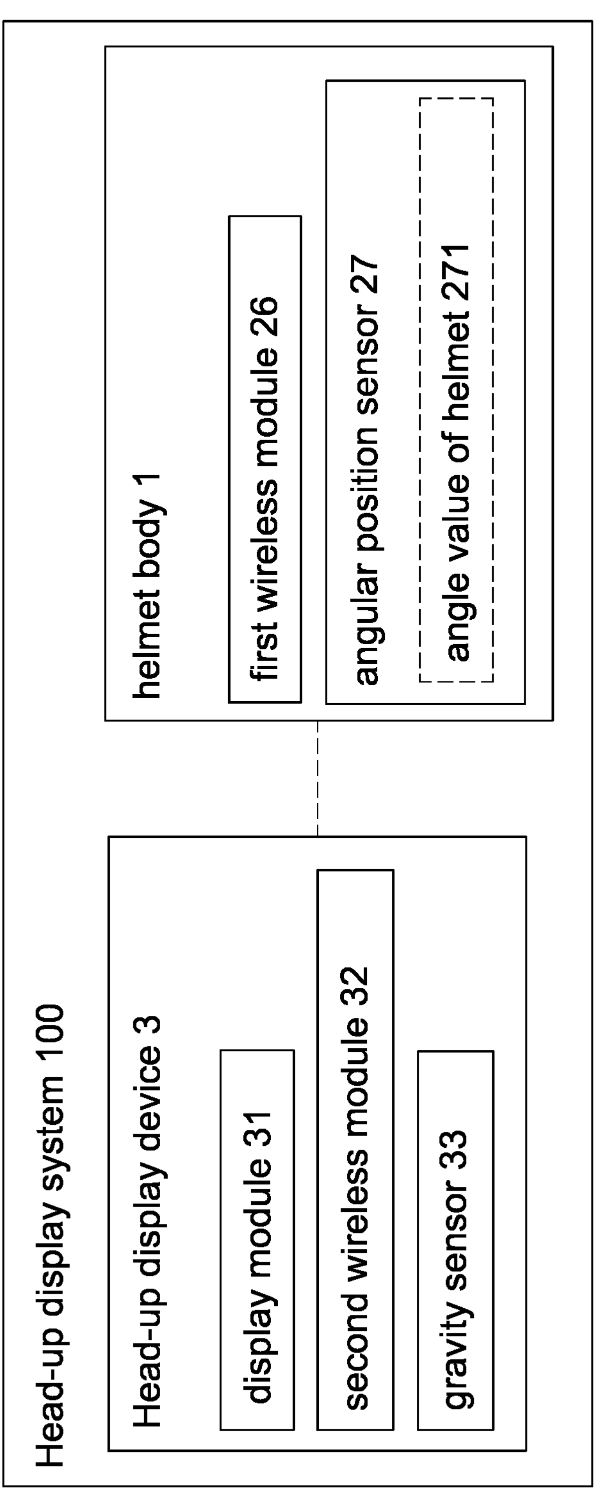
FIG. 5 is a block diagram of a display system.

Please refer to FIG. 2 and FIG. 5, a display system 100 comprises the head-up display device 3 and the helmet. The head-up display device 3 is configured on the mobile vehicle or a dashboard of the steering handle to replace the display of the dashboard on the steering handle. The helmet is worn by the rider. The details of the structure of the helmet and the shield are described above, herein it is repeated no more.

The helmet has a base 11 provided with an angular position sensor 27, a first wireless modules 26 and a battery (not shown). The battery provides electricity for the aforementioned electronic components. The angular position sensor 27 is a gyroscope, an acceleration sensor or an image sensor for identifying angles of the helmet by an image identification, and determining an angle value of the helmet 271 to correspond to the motions of looking down or looking up of the rider. The first wireless module 26 performs a wireless transmission on the angle value of the helmet 271.

The head-up display device 3 comprises a control module, a display module 31, and a second wireless module 32. The display module 31 projects the image D provided with at least two modes, e.g., a high brightness mode and a low brightness mode. The second wireless module 32 receives the angle value of the helmet 271, the control module of the heap-up display device 3 determining the brightness of the image D displayed on the display module 31 based on the angle value of the helmet 271.

Figure 6:
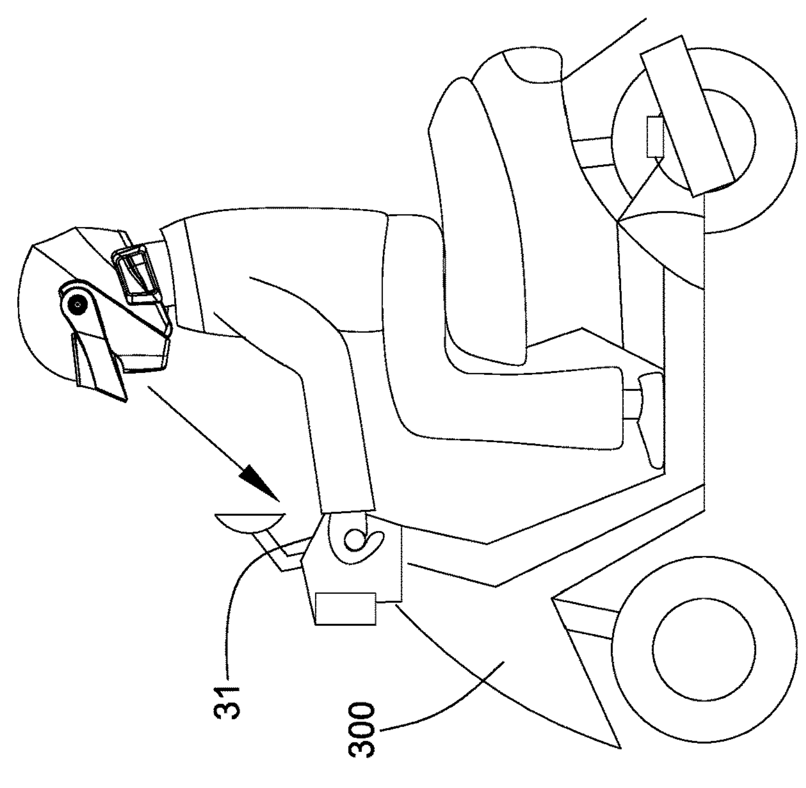
FIG. 6 and FIG. 7 are schematic diagrams of the display system in use.
Figure 6:
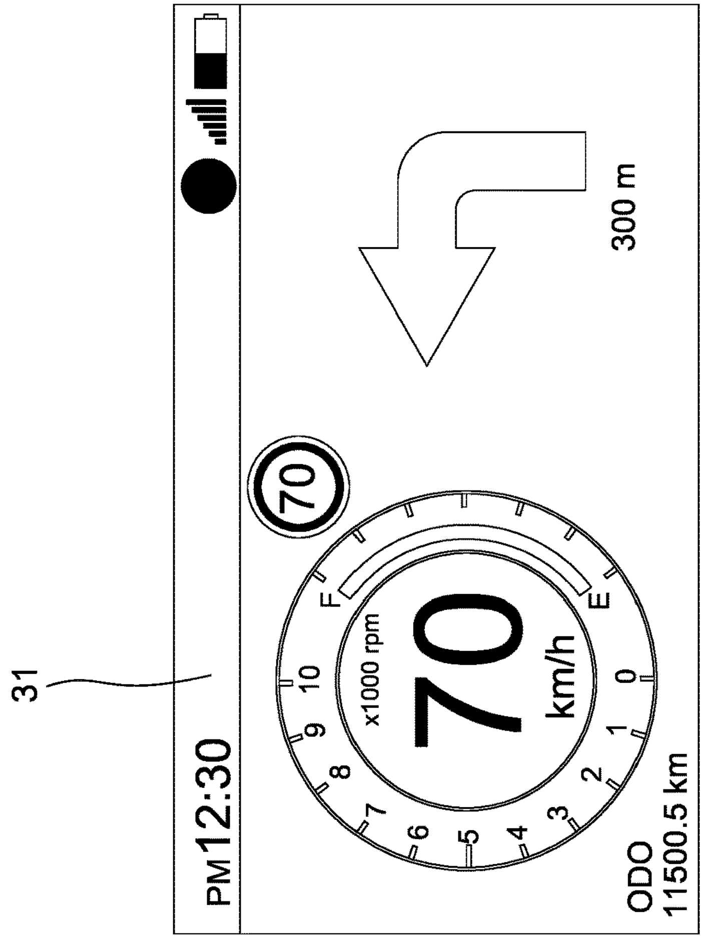

Comparing to the angle of the helmet during riding, when the helmet leans forward, the image D is in the low brightness mode, enabling the rider to observe directly from the transparent shield with his head down, as shown in FIG. 6. It is possible to set the image D as the dashboard and prevent the sunlight too strong to affect the rider to read the content on the dashboard. Compared to the image D being directly projected to a windshield (of the mobile vehicle) to form a head-up display image for the user to read, the present disclosure is capable of projecting the image D to the shield 2 in a lower brightness mode for the user to read.

Figure 7:
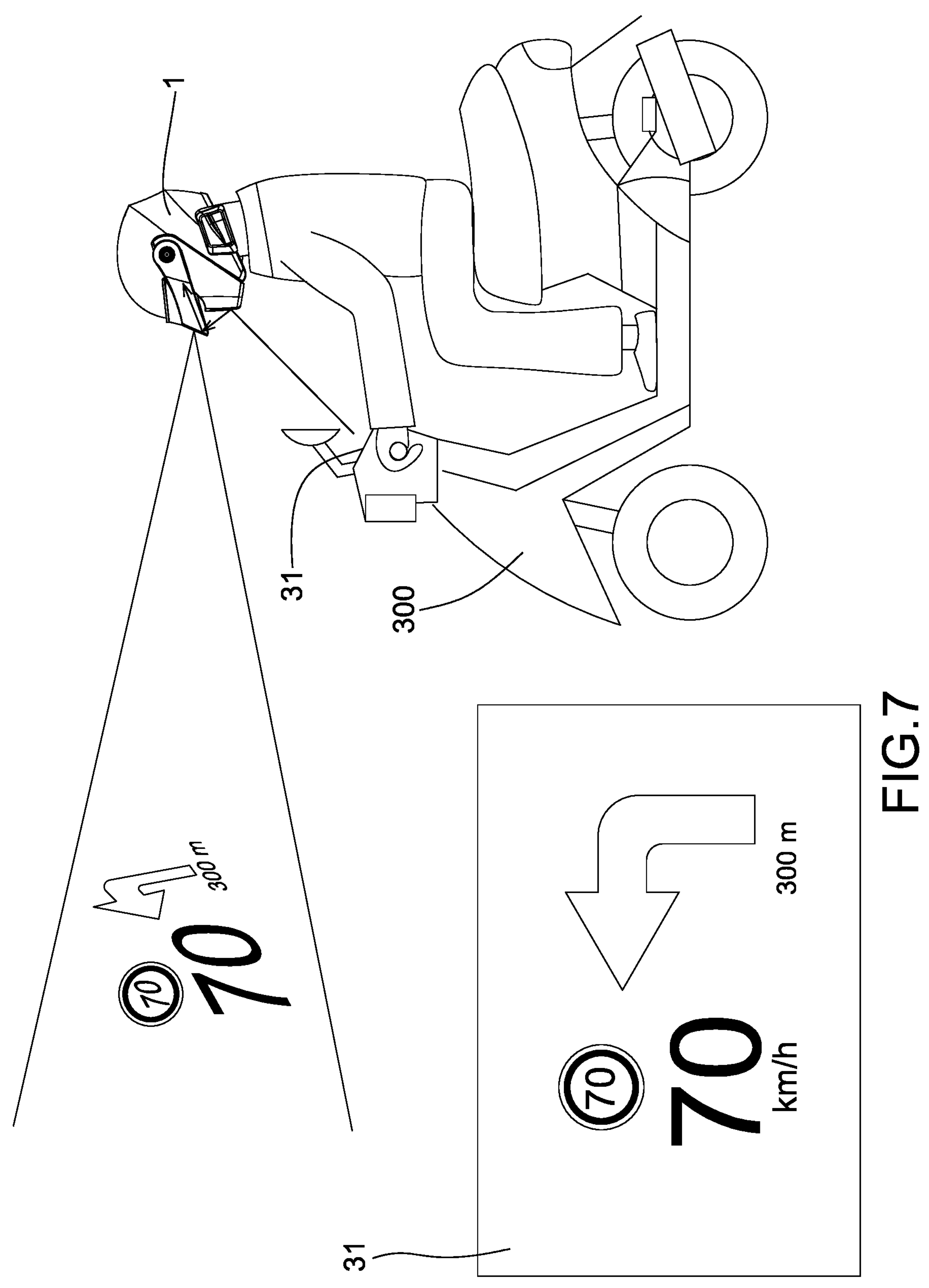

When the helmet maintains within an angle range during riding (nearly perpendicular), the display module 31 projects the image D in the high brightness mode, as shown in FIG. 7, enabling the rider to observe the front scene with his head up, and it is possible to set the image D as the screen of the head-up display device. In some embodiment, it is possible to set the aforementioned riding angle when the rider is about to ride the mobile vehicle 300 to avoid being affected by angle differences caused by individual habits of wearing the helmet. In some embodiment, the display module 31 is provided with more than two (e.g., more than three) brightness modes. The brightness displayed in the high brightness mode is greater than the brightness displayed in the low brightness mode. The head-up display device 3 further comprises an optical sensor module for detecting the brightness of the surroundings, e.g., day or night, adjusting the brightness of the image D.

The first wireless module 26 and the second wireless module 32 are Bluetooth modules provided with a pairing information. The base 11 and the head-up display device 3 each have a certified chip to ensure that the first wireless module 26 and the second wireless module pair correctly. The head-up display device 3 projects the image D to a specific shield of the helmet based on the pairing information, so that the head-up display device 3 doesn't receive a wrong angle value to display a wrong brightness. In some embodiment, the head-up display device 3 is capable of connecting to smartphones, providing navigation information to the head-up display device 3 through push.

Alternatively, the first wireless module 26 and the second wireless module 32 are RFID modules such as an RFID reader and an RFID chip individually. The RFID chip is electrically connected to the angular position sensor 27 in order to store the angle value of the helmet 271, the control module of the head-up display device 3 recording an identifying inventory number (identifier) of the RFID chip and reading the angle value of the helmet 271 based on the identifying inventory number (identifier) from the RFID chip, so that there is no need to arrange a wireless module with an automatic connection and it is possible to extend an endurance of the electronic components inside the helmet.

In some embodiment, the head-up display device 3 comprises an acceleration sensor, e.g., a gravity sensor 33 for compensating a wrong judgement caused by inertial shakes during acceleration and deceleration of the mobile vehicle 300.

In some embodiment, the display module 31 is a display panel with high efficiency and high brightness, performing a high backlight and a high contrast image D with a screen brightness of about 40,000 nits at a controllable heating temperature.

What is claimed is:

1. A head-up display device, suitable for constructing on a mobile vehicle and connecting to a first wireless module of a helmet, the helmet comprising a shield and an angular position sensor for determining an angle value of the helmet, the head-up display device comprising:

a second wireless module, receiving the angle value of the helmet from the first wireless module;

a display module, selecting a high brightness mode or a low brightness mode based on the angle value and projecting an image to the shield of the helmet;

wherein, when the angle value maintains within an angle range which is responded to a head up position, the display module projects the image in the high brightness mode;

wherein, when the angle value maintains within an angle range which is responded to a head down position, the display module projects the image in the low brightness mode.

2. The head-up display device of claim 1, wherein the shield includes an object lens and an ocular lens; wherein the object lens reflects the image, the image being reflected by the object lens and then projected to the ocular lens.

3. The head-up display device of claim 2, wherein the image is reflected by a front surface of the object lens and then projected to a rear surface of the ocular lens.

4. The head-up display device of claim 1, further comprising an acceleration sensor for detecting changes of the angle value due to inertia.

5. The head-up display device of claim 1, wherein the second wireless module and the first wireless module of the helmet are provided with a pairing information; wherein the display module projects the image to the shield based on the pairing information.

6. The head-up display device of claim 1, wherein the display module is provided with more than two kinds of brightness modes.

7. The head-up display device of claim 1, wherein the second wireless module comprises Bluetooth module or RFID module.

* * * * *